(12) United States Patent
Humphries et al.

(10) Patent No.: US 7,467,075 B2
(45) Date of Patent: Dec. 16, 2008

(54) THREE-DIMENSIONAL FINITE-ELEMENT CODE FOR ELECTROSURGERY AND THERMAL ABLATION SIMULATIONS

(75) Inventors: Stanley Humphries, Albuquerque, NM (US); Kyle R. Rick, Boulder, CO (US); David A. Schechter, Longmont, CO (US); Nahum Goldberg, Boston, MA (US)

(73) Assignee: Covidien AG, Neuhausen am Rheinfall (CH)

(*) Notice: Subject to any disclaimer, the term of this patent is extended or adjusted under 35 U.S.C. 154(b) by 262 days.

(21) Appl. No.: 11/314,332

(22) Filed: Dec. 21, 2005

(65) Prior Publication Data

US 2006/0257836 A1    Nov. 16, 2006

Related U.S. Application Data

(60) Provisional application No. 60/638,560, filed on Dec. 23, 2004.

(51) Int. Cl.
*G06F 9/45* (2006.01)
(52) U.S. Cl. .............................. 703/11; 606/39; 606/32; 606/34; 606/49; 600/420; 600/458; 600/374
(58) Field of Classification Search .................. 703/13, 703/11, 7, 9, 10; 606/39, 32, 34, 49, 50; 604/890.1; 600/420, 458, 374, 322; 324/239; 128/898
See application file for complete search history.

(56) References Cited

U.S. PATENT DOCUMENTS

| | | |
|---|---|---|
| 4,074,718 A | 2/1978 | Morrison, Jr. |
| 4,411,266 A | 10/1983 | Cosman |
| 4,565,200 A | 1/1986 | Cosman |
| 4,576,177 A | 3/1986 | Webster, Jr. |
| 4,608,977 A | 9/1986 | Brown |
| 4,662,383 A | 5/1987 | Sogawa et al. |
| 4,739,759 A | 4/1988 | Rexwroth et al. |
| 4,832,024 A | 5/1989 | Boussignac et al. |
| 4,880,719 A | 11/1989 | Murofushi et al. |
| 4,961,435 A | 10/1990 | Kitagawa et al. |
| 4,966,597 A | 10/1990 | Cosman |

(Continued)

FOREIGN PATENT DOCUMENTS

DE    2407559    2/1974

(Continued)

OTHER PUBLICATIONS

Panescu et al., "Three dimensional finite element analysis of current density and temperature distributions during radio frequency ablation", IEEE, 1995.*

(Continued)

*Primary Examiner*—Kandasamy Thangavelu

(57) ABSTRACT

A system and method for performing a simulation of an electrosurgical procedure are disclosed. The method includes the steps of generating a three-dimensional medium, which includes one or more material regions representing a physical object. The method also includes the steps of dividing the medium into multiple hexahedron elements to generate a three-dimensional conformal mesh and assigning each element to the material region. The method further includes the steps of calculating an electrical energy solution and a thermal transport solution and generating graphical representations illustrating one or more aspects of the electrical energy and the thermal transport solutions.

19 Claims, 12 Drawing Sheets

U.S. PATENT DOCUMENTS

| | | | |
|---|---|---|---|
| 4,993,430 A | 2/1991 | Shimoyama et al. | |
| 5,029,588 A | 7/1991 | Yock et al. | |
| 5,103,804 A | 4/1992 | Abele et al. | |
| 5,225,741 A | 7/1993 | Auld et al. | |
| 5,230,623 A | 7/1993 | Guthrie et al. | |
| 5,267,994 A | 12/1993 | Gentelia et al. | |
| 5,281,213 A | 1/1994 | Milder et al. | |
| 5,323,778 A | 6/1994 | Kandarpa et al. | |
| 5,330,518 A | 7/1994 | Nielson et al. | |
| 5,334,193 A | 8/1994 | Nardella | |
| 5,342,357 A | 8/1994 | Nardella | |
| 5,348,554 A | 9/1994 | Imran et al. | |
| 5,370,675 A | 12/1994 | Edwards et al. | |
| 5,383,876 A | 1/1995 | Nardella | |
| 5,383,917 A | 1/1995 | Desai et al. | |
| 5,385,148 A | 1/1995 | Lesh et al. | |
| 5,403,311 A | 4/1995 | Abele et al. | |
| 5,409,000 A | 4/1995 | Imran | |
| 5,409,006 A | 4/1995 | Buchholtz et al. | |
| 5,433,739 A | 7/1995 | Sluijter et al. | |
| 5,458,597 A | 10/1995 | Edwards et al. | |
| 5,462,521 A | 10/1995 | Brucker et al. | |
| 5,472,441 A | 12/1995 | Edwards et al. | |
| 5,490,850 A | 2/1996 | Ellman et al. | |
| 5,500,012 A | 3/1996 | Brucker et al. | |
| 5,520,684 A | 5/1996 | Imran | |
| 5,536,267 A | 7/1996 | Edwards et al. | |
| 5,571,147 A | 11/1996 | Sluijter et al. | |
| 5,588,432 A | 12/1996 | Crowley | |
| 5,599,345 A | 2/1997 | Edwards et al. | |
| 5,647,871 A | 7/1997 | Levine et al. | |
| 5,662,111 A | 9/1997 | Cosman | |
| 5,688,267 A | 11/1997 | Panescu et al. | |
| 5,735,847 A | 4/1998 | Gough et al. | |
| 5,775,338 A | 7/1998 | Hastings | |
| 5,792,146 A | 8/1998 | Cosman | |
| 5,830,133 A * | 11/1998 | Osten et al. | 600/322 |
| 5,848,967 A | 12/1998 | Cosman | |
| 5,849,011 A | 12/1998 | Jones et al. | |
| 5,868,740 A | 2/1999 | LeVeen et al. | |
| 5,921,982 A | 7/1999 | Lesh et al. | |
| 5,951,546 A | 9/1999 | Lorentzen | |
| 6,001,093 A | 12/1999 | Swanson et al. | |
| 6,006,126 A | 12/1999 | Cosman | |
| 6,053,912 A | 4/2000 | Panescu et al. | |
| 6,059,780 A | 5/2000 | Gough et al. | |
| 6,061,551 A | 5/2000 | Sorrells et al. | |
| 6,074,389 A | 6/2000 | Levine et al. | |
| 6,080,149 A | 6/2000 | Huang et al. | |
| 6,106,524 A | 8/2000 | Eggers et al. | |
| 6,146,380 A | 11/2000 | Racz et al. | |
| 6,162,216 A | 12/2000 | Guziak et al. | |
| 6,203,541 B1 | 3/2001 | Keppel | |
| 6,241,725 B1 | 6/2001 | Cosman | |
| 6,287,305 B1 | 9/2001 | Heim et al. | |
| 6,306,132 B1 | 10/2001 | Moorman et al. | |
| 6,337,998 B1 | 1/2002 | Behl et al. | |
| 6,398,782 B1 * | 6/2002 | Pecor et al. | 606/50 |
| 6,478,793 B1 | 11/2002 | Cosman et al. | |
| 6,500,172 B1 | 12/2002 | Panescu et al. | |
| 6,506,189 B1 | 1/2003 | Rittman, III et al. | |
| 6,530,922 B2 | 3/2003 | Cosman et al. | |
| 6,546,270 B1 * | 4/2003 | Goldin et al. | 600/374 |
| 6,575,969 B1 | 6/2003 | Rittman, III et al. | |
| 6,605,085 B1 | 8/2003 | Edwards | |
| 7,004,174 B2 * | 2/2006 | Eggers et al. | 128/898 |
| 7,189,578 B1 * | 3/2007 | Feng et al. | 436/174 |
| 2001/0034518 A1 | 10/2001 | Edwards et al. | |
| 2002/0111615 A1 | 8/2002 | Cosman et al. | |
| 2002/0120261 A1 | 8/2002 | Morris et al. | |
| 2002/0156472 A1 | 10/2002 | Lee et al. | |
| 2003/0040741 A1 * | 2/2003 | Fleenor et al. | 606/32 |
| 2003/0171672 A1 * | 9/2003 | Varghese et al. | 600/420 |
| 2004/0002745 A1 | 1/2004 | Fleming et al. | |
| 2004/0024396 A1 * | 2/2004 | Eggers | 606/39 |
| 2004/0039429 A1 | 2/2004 | Daniel et al. | |
| 2004/0056654 A1 * | 3/2004 | Goldfine et al. | 324/239 |
| 2004/0167515 A1 * | 8/2004 | Petersen et al. | 606/49 |
| 2004/0181216 A1 | 9/2004 | Kelly et al. | |
| 2004/0254573 A1 | 12/2004 | Dycus | |
| 2005/0033277 A1 * | 2/2005 | Clague et al. | 606/32 |
| 2005/0055014 A1 * | 3/2005 | Coppeta et al. | 604/890.1 |
| 2005/0107784 A1 | 5/2005 | Moses | |
| 2005/0107785 A1 | 5/2005 | Dycus | |
| 2005/0119655 A1 | 6/2005 | Moses | |
| 2005/0143656 A1 * | 6/2005 | Burbank et al. | 600/458 |
| 2005/0143724 A1 * | 6/2005 | El-Galley et al. | 606/34 |
| 2005/0154387 A1 | 7/2005 | Moses | |
| 2005/0155743 A1 | 7/2005 | Getz, Jr. et al. | |
| 2005/0192564 A1 | 9/2005 | Cosman et al. | |
| 2006/0079885 A1 | 4/2006 | Rick et al. | |
| 2006/0079886 A1 | 4/2006 | Orszulak | |
| 2006/0079887 A1 | 4/2006 | Buysse | |

FOREIGN PATENT DOCUMENTS

| | | |
|---|---|---|
| EP | 0171967 A | 2/1986 |
| EP | 0246350 | 11/1987 |
| EP | 0310431 | 4/1989 |
| EP | 0608609 | 8/1994 |
| EP | 1465037 A | 10/2004 |
| WO | WO 93/24066 | 12/1993 |
| WO | WO 94/28809 | 12/1994 |
| WO | WO 96/04860 | 2/1996 |
| WO | WO 96/18349 | 6/1996 |
| WO | WO 96/29946 | 10/1996 |
| WO | WO 96/34571 | 11/1996 |
| WO | WO 96/39914 | 12/1996 |
| WO | WO 97/06739 | 2/1997 |
| WO | WO 97/06740 | 2/1997 |
| WO | WO 97/06855 | 2/1997 |
| WO | WO 97/17029 | 5/1997 |
| WO | WO 99/01074 | 1/1999 |
| WO | WO 99/04710 | 2/1999 |
| WO | WO 01/00114 A1 | 1/2001 |
| WO | WO 2005/009528 | 2/2005 |

OTHER PUBLICATIONS

Li et al., "Conformal microwave imaging for breast cancer detection", IEEE 2003.*

Kim et al., "Origin of impedance change in impedance cardigraphy by a three-dimensional finite element model", IEEE 1988.*

Cosman ER, Cosman BJ: "Methods of Making Nervous System Lesions", in William RH, Rengachary SS (eds): Neurosurgery. New York: McGraw-Hill, vol. 111, pp. 2490-2498, 1984.

Anderson, Gary et al., "A numerical study of rapid heating for high temperature radio frequency hyperthermia". International Journal of Bio-Medical Computing, 35 (1994) 297-307.

Goldberg, et al., "Tissue Ablation with Radiofrequency: Effective Probe Size, Gauge, Duration and Temperature and Lesion Volume", Acad Radio, 1995, vol. 2, No. 5, pp. 399-404.

Melvin A. Astrahan, "A Localized Current Field Hyperthermia System for Use with 192-Iridium Interstitial Implants", Medical Physics, 9(3), May/Jun. 1982.

Cosman et al. "Theoretical Aspects of Radiofrequency Lesions in the Dorsal Root Entry Zone". Neurosurgery 15:945-950, 1984.

Stuart W. Young, Nuclear Magnetic Resonance Imaging—Basic Principles, Raven Press, New York, 1984.

E.R. Cosman, et al., "Radiofrequency Lesion Generation and its Effect on Tissue Impedance", Applied Neurophysiology, 51:230-242, 1988.

K. Ogata, Modern Control Engineering, Prentice-Hall, Englewood Cliffs, N.J., 1970.

E. Alexander et al., "Magnetic resonance image-directed stereotactic neurosurgery: use of image fusion with computerized tomography to enhance spatial accuracy", J. Neurosurg., 83:271, 276, 1995.

Reidenbach (1995) "First Experimental Results with Special Applicators for High-Frequency Interstitial Thermotherapy", Society Minimally Ivasive Therapy, 4(Suppl 1) :40 (Abstr).

Organ LW. (1976) "Electrophysiologic Principles of Radiofrequency Lesion Making" Appl. Neurophysiol, vol. 39: pp. 69-76.

Livraghi et al. (1995) "Saline-enhanced RF Tissue Ablation in the Treatment of Liver Metastases", Radiology. 205-210.

Solbiati et al. (1995) "Percutaneous US-guided RF Tissue Ablation of Liver Metastases: Long-term Follow-up", Radiology, 197(P): 199.

Solbiati. et al. (2001) "Percutaneous Radio-frequency Ablation of Hepatic Metastases from Colorectal Cancer: Long-term Results in 117 Patients", *Radiology*, vol. 221, pp. 159-166.

Goldberg. et al., "Image-guided Radiofrequency Tumor Ablation: Challenges and Opportunities—Part I", (2001) *J Vasc. Interv. Radiol.* vol. 12, pp. 1021-1032.

McGahan et al. (1995) "Percutaneous Ultrasound-guided Radiofrequency Electrocautery Ablation of Prostate Tissue in Dogs", Acad Radiol. vol. 2, No. 1:pp. 61-65.

Goldberg et al. (1995) "Tissue Ablation with Radiofrequency Using Multiprobe Arrays", Acad Radiol, vol. 2: pp. 399-404.

Goldberg et al. (1995) "Saline-enhanced RF Ablation: Demonstration of Efficacy and Optimization of Parameter". Radiology, 197(P): 140 (Abstr).

Humphries et al., (1997) "Finite-Element Codes to Model Electrical Heating and Non-Linear Thermal Transport in Biological Media", Proc. ASME HTD-355, 131.

European Search Report from Application EP 05021935 dated Jan. 27, 2006.

European Search Report from Application EP 05021939 dated Jan. 27, 2006.

European Search Report from Application EP 05021025 dated Mar. 13, 2006.

European Search Report from Application EP 05021936.9 dated Feb. 6, 2006.

\* cited by examiner

THREE-DIMENSIONAL FINITE-ELEMENT CODE FOR ELECTROSURGERY AND THERMAL ABLATION SIMULATIONS

CROSS-REFERENCE TO A RELATED APPLICATION

This application claims priority to U.S. Provisional Application Ser. No. 60/638,560 filed on Dec. 23, 2004 by Humphries et al. entitled "THREE-DIMENSIONAL FINITE-ELEMENT CODE FOR ELECTROSURGERY AND THERMAL ABLATION SIMULATIONS," the entire contents of which are hereby incorporated by reference herein.

BACKGROUND

1. Field

The present disclosure relates generally to data processing and computer simulation systems, and more particularly, to a method and system for simulations electrosurgical RF thermal ablation processes.

2. Description of the Related Art

Electrosurgery procedures involve the application of RF electric fields to produce local heating. The goal is to destroy or to alter selected tissues. Applications include blood-vessel cauterization, incision sealing and minimally-invasive procedures for tumor destruction. By their nature, electrosurgery procedures induce large changes in the thermal and electrical properties of tissue. In many procedures, the application of RF power follows a complex temporal sequence to ensure effective local treatment while minimizing damage to surrounding tissues. In the past, the design of equipment and the choice of operation sequence relied primarily on empirical experience. As a result, investigation of new applications is generally a long drawn out, difficult and costly process.

Computer simulations can play an important role in reducing the cost and time associated with certain experiments. In other words, simulations offer a relatively quick and inexpensive approach to fill in missing data points, to investigate novel methods or to optimize existing procedures.

Considering the complexity of electrosurgical procedures, generic finite-element software is generally not very useful. Conventional electrosurgical simulation software relies on two-dimensional simulations in cylindrical or planar geometries. Such software suites are incapable of determining end effects for many electrosurgical procedures. These software suites are also unable to provide solutions for simple electrosurgical probes which may be significantly altered by the presence of nearby asymmetric structures like blood vessels.

Therefore there exists a need for a system and method for simulation of electrosurgical procedures which provides solutions in a three-dimensional medium.

SUMMARY

A method and system for simulating the effect of electrosurgical processes such as RF tumor ablation are provided. The method according to the present disclosure covers the complete calculation process from mesh generation to solution analysis. The method employs three-dimensional conformal meshes to handle cluster probes and other asymmetric assemblies. The conformal-mesh approach is advantageous for high-accuracy surface integrals of net electrode currents. The simulation algorithm performs coupled calculations of RF electric fields in conductive dielectrics and thermal transport via dynamic solutions of the bioheat equation. The boundary-value RF field solution is updated periodically to reflect changes in material properties.

The simulation algorithm also features advanced material models with the option for arbitrary temperature variations of thermal and electrical conductivity, perfusion rate, and other quantities. The algorithm handles irreversible changes by switching the material reference of individual elements at specified transition temperatures. The simulation algorithm is controlled through a versatile interpreter language to enable complex run sequences. The algorithm can also automatically maintain constant current or power, switch to different states in response to temperature or impedance information, and adjust parameters on the basis of user-supplied control functions.

According to one embodiment of the present disclosure a method for performing a simulation of an electrosurgical procedure is disclosed. The method includes the steps of generating a three-dimensional medium, which includes one or more material regions representing a physical object. The method also includes the steps of dividing the medium into multiple hexahedron elements to generate a three-dimensional conformal mesh and assigning each element to the material region. The method further includes the steps of calculating an electrical energy solution and a thermal transport solution and generating graphical representations illustrating one or more aspects of the electrical energy and the thermal transport solutions.

According to another embodiment of the present disclosure, a system for performing a simulation of an electrosurgical procedure is disclosed. The system includes a processor configured for generating a three-dimensional medium, which includes one or more material regions representing a physical object. The processor divides the medium into multiple hexahedron elements to generate a three-dimensional conformal mesh and assigns each element to the material region. The processor also calculates an electrical energy solution and a thermal transport solution. The system further includes a display device for generating graphical representations illustrating one or more aspects of the electrical energy and the thermal transport solutions.

According to a further embodiment of the present disclosure, a set of computer-executable instructions for performing a simulation of an electrosurgical procedure is disclosed. The set of computer-executable instructions includes the steps of generating a three-dimensional medium, which includes one or more material regions representing a physical object. The method also includes the steps of dividing the medium into multiple hexahedron elements to generate a three-dimensional conformal mesh and assigning each element to the material region. The method further includes the steps of calculating an electrical energy solution and a thermal transport solution and generating graphical representations illustrating one or more aspects of the electrical energy and the thermal transport solutions.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1:
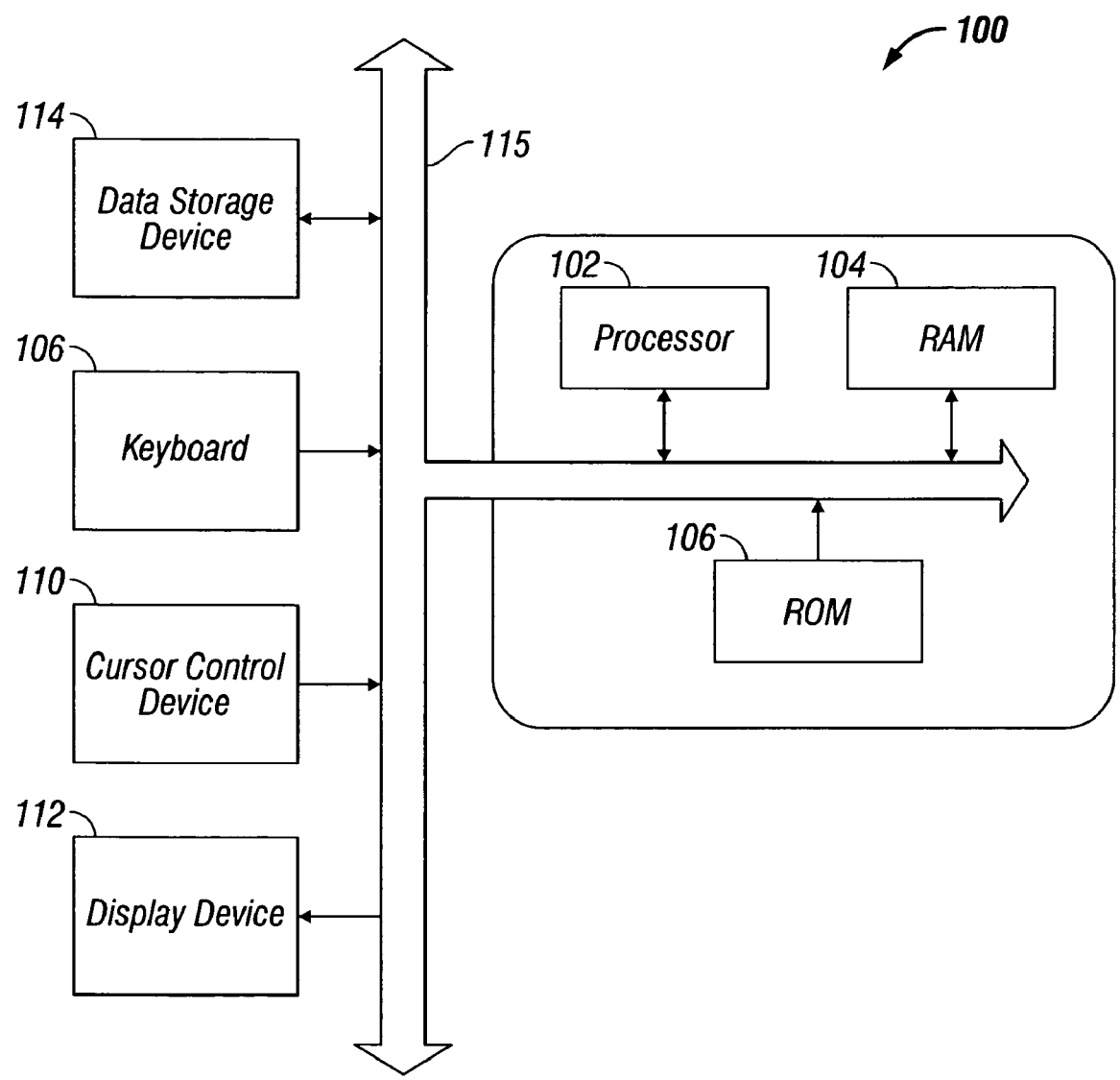
FIG. 1 is a schematic diagram of an exemplary computer system.

Preferred embodiments of the present disclosure are described herein with reference to the accompanying drawings. In the following description, well-known functions or constructions are not described in detail to avoid obscuring the present disclosure in unnecessary detail.

1. Introduction

It is to be understood that the present disclosure may be implemented in various forms of hardware, software, firmware, special purpose processors, or a combination thereof. In one embodiment, the present disclosure may be implemented in software as an application program tangibly embodied on a program storage device. The application program may be uploaded to, and executed by, a computer system 100 comprising any suitable architecture such as a personal computer, a workstation or server. The system 100 is implemented on a computer platform having hardware such as one or more central processing units (CPU) (e.g., processor 102), a random access memory (RAM) 104, a read only memory (ROM) 106 and input/output (I/O) interface(s) such as a keyboard 108, cursor control device (e.g., a mouse or joystick) 110 and display device 112. A system bus 115 couples the various components and may be any of several types of bus structures including a memory bus or memory controller, a peripheral bus, and a local bus using any of a variety of bus architectures. The computer platform also includes an operating system and micro instruction code, which may be stored in a data storage device 114. The various processes and functions described herein may either be part of the micro instruction code or part of the application program (or a combination thereof) which is executed via the operating system. In addition, various other peripheral devices may be connected to the computer platform by various interfaces and bus structures, such as a parallel port, serial port or universal serial bus (USB), for example, additional storage devices and a printer.

It is to be further understood that because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

The simulation algorithm according to present disclosure may be run on personal computers under Microsoft Windows™ or Linux™ operating systems and/or software. The algorithm includes an interactive mesh generator, solution programs for RF fields and thermal transport and dedicated post-processors for plots and data analysis. The method according to present disclosure utilizes conformal hexahedron meshes for high-accuracy surface integrals, calculates electrical and thermal solutions with temperature-dependent effects, incorporates advanced material models, and further includes a built-in script interpreter with a flexible control language for autonomous operation.

The following section, Section 2, describes the nature of conformal hexahedron meshes and the tools used for their creation. Section 3 covers solution methods for coupled RF electric fields and thermal transport. Section 4 reviews techniques for modeling temperature-dependent properties of materials (including phase changes) while Section 5 describes methods to operate probes at fixed current or as part of a temperature-control loop. Features of the interpreter language for sequence control are described in Section 6. Features of the postprocessors are covered in Section 7. Section 8 presents examples that illustrate some advanced features of the algorithm.

2. Mesh Generation

The foundation of the finite-element method for field solutions is to divide the solution space (e.g., a segment and/or medium 8 of a simulated surgical site) into small volumes (e.g., elements). The division is performed in such a way that each element is uniquely part of one material region. In particular, the material regions may also represent electrodes, insulators or different types of tissue (e.g., blood vessels, muscles, etc.). This process simplifies the calculations as well as the organization of the code—only one material model is applied to each element. The division facilitates the conversion of the governing partial differential equations for RF fields and temperature to large sets of coupled linear equations. Such equation systems are easily solved on a digital computer, an example of which is discussed above.

Figure 2C:
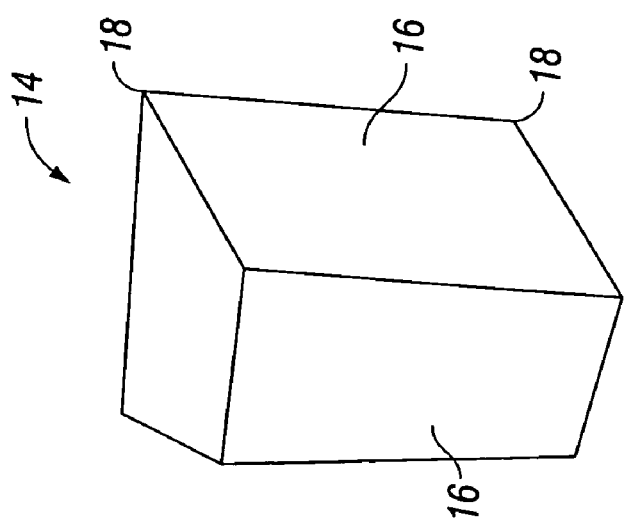
FIG. 2C shows a three-dimensional hexahedron element.
Figure 2B:
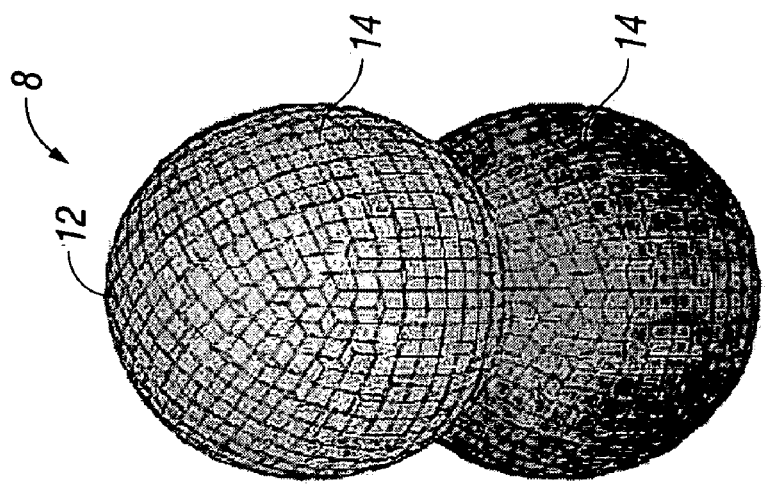
FIG. 2B shows a conformal mesh comprising hexahedron elements.
Figure 2A:
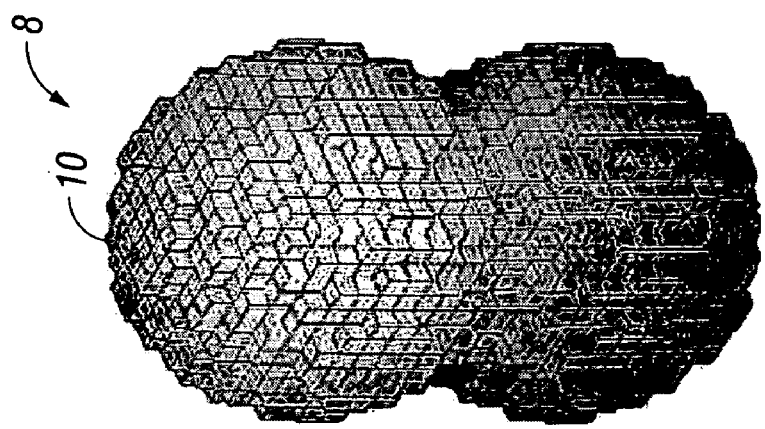
FIG. 2A shows a non-conformal mesh comprising box elements.

The simplest way to divide space, e.g., medium 8, is the non-conformal mesh 10 of FIG. 2A which employs box elements. However, this approach leads to a poor representation of surfaces between material regions since curved surfaces are approximated and are not accurately represented. As a result, field calculations near the surface of material regions are inaccurate. For example, surface integrals of current over the sphere represented by non-conformal mesh may be inaccurate.

FIG. 2B shows a conformal mesh 12 representing the medium 8, which gives highly-accurate results in surface field calculations. In a conformal mesh, elements are flexed near region boundaries so that facets lie close to the desired shape. The box elements are transformed to generalized hexahedrons. An exemplary hexahedron element 14 is shown in FIG. 2C.

Mesh generation is accomplished by ordering elements 14 according to cubic logic. However, elements 14 may have arbitrary shapes. The element 14 includes a plurality of facets 16 and nodes 18 (e.g., indices). The facets 16 may meet at a variety of angles allowing for flexible shapes which more closely approximate the medium. In other words, each element has a unique set of indices along the coordinate axes such that element (I+1, J, K) is adjacent to element (I, J, K).

Mesh structure allows faster field solutions, where the boundary-value solution for RF electric field may be updated hundreds of times during execution with temperature-dependent materials.

Figure 3:
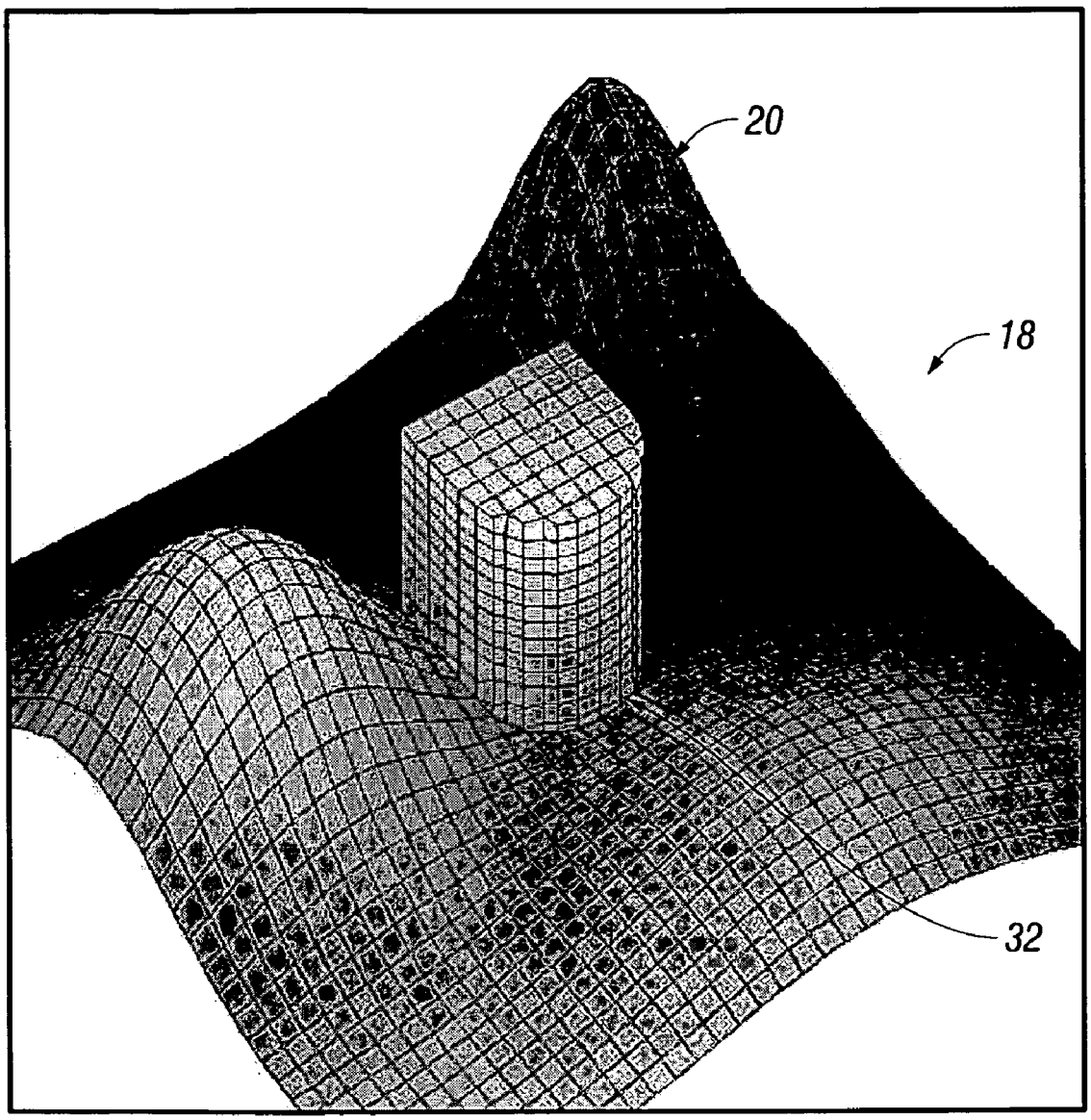
FIG. 3 is an exemplary generated surface of a medium.

FIG. 3 illustrates an exemplary generated surface of the medium 8, which includes mathematically-generated surfaces from a Table 1 containing elevation values. The mesh in the FIG. 3 combines a mathematical surface representative of tissue 20 with an extrusion (e.g., electrosurgical probe 32).

Table 1 shows the script to generate the shapes. In the present disclosure, the program was adapted to use constructive solid geometry techniques to fabricate complex assemblies from simple parts (i.e., cylinders, spheres and cones, extrusions, turnings, etc.).

TABLE 1

MetaMesh script to generate FIG. 3

```
PART
      Type      Surf 3D FIG.D02.DATE
      Name      TestSurface
      Region    TestSurface
      Fab       -1.00
      Surface   Region         SVolume 1.00
END
PART
      Type      Extrusion
      L         -1.0   -1.0    1.0   -1.0    S
      L          1.0   -1.0    1.0    0.0    S
      A          1.0    0.0    0.0    1.0         0.0  0.0  S
      A          0.0    1.0   -1.0    0.0         0.0  0.0  S
      L         -1.0    0.0   -1.0   -1.0    S
      End
      Region    Electrode
      Fab       9.00
      Surface   Region         SVolume
      Rotate    0.0  0.0       180.0
END
```

3. Field Solution Techniques

Electrosurgery simulations involve two finite-element solutions: radiofrequency ("RF") electric fields and thermal transport. Structures generated in the medium are common to both solutions. Consequently, the method of the present disclosure uses the same mesh for the RF and thermal solutions, assigning different physical properties to the regions. Because there is little change in thermal properties over a period of the RF field, the electric field solution is handled as a boundary value problem with periodic updating. The following equation governs the RF electric field solution:

$$\nabla \cdot \left[\left(\varepsilon_r - \frac{j\sigma}{\varepsilon_0 \omega}\right)\nabla \phi\right] = 0 \quad (1)$$

In Equation 1, $\varepsilon_r$ is the relative dielectric constant of the element 14 and $\sigma$ is the electrical conductivity. The quantity $\phi$ (the quasi-static potential) is a complex number. The amplitude and phase of the electric field is given by:

$$E = -\nabla\phi \quad (2)$$

The electric field provides one of the source terms for the thermal transport equation:

$$q_e = \sigma E \cdot E^*/2 \quad (3)$$

Equations 1 and 2 include effects of both real and displacement currents and hold in the non-radiative limit. The validity condition is that the radiated electromagnetic energy leaving the patient is small compared to the deposited energy. The condition holds when the RF wavelength is large compared to the treatment area.

Conversion of Equation 1 to finite-element form uses the standard minimum-residual method with quasi-linear shape functions for the hexahedron elements 14. The resulting linear equation set determines $\phi$ at the element 14 node locations. Each equation involves coupling to 27 neighboring nodes. The coupling coefficients are computed by taking numerical integrals over elements using the normal coordinate method. The equations are solved with an interactive matrix-inversion technique. An initial electric field solution with 400,000 nodes requires about 2 minutes on a 3.0 GHz computer. The solution time is shorter for updates with temperature-dependent $\varepsilon_r$ or $\sigma$ if changes are relatively small.

The method of the present disclosure solves the following relationship (often known as the bioheat equation) for thermal transport:

$$\rho C_p \frac{\partial T}{\partial t} = \nabla \cdot (k \nabla T) + q_e + q_m + W_b(T_b - T) \quad (4)$$

In Equation 4, $\rho$ is the density of the medium, $C_p$ is the specific heat, k is the thermal conductivity, $q_e$ is the resistive source from Equation 3 and $q_m$ is any other source such as metabolism. The term $W_b(T_b - T)$ is a thermal source or sink resulting from the volume-averaged perfusion of blood through capillaries. Here, $W_b$ is the blood flow rate and $T_b$ is the incoming blood temperature.

The system and method of the present disclosure recast the minimum-residual formulation for the conformal mesh to reduce coupling to the six nearest nodes. The resulting solutions are fast and stable for all mesh geometries and choices of time step at the expense of some reduction in accuracy.

Execution of the algorithm consists of an initial RF solution followed by a thermal solution over a specified time span. Temperature-dependent thermal quantities are updated each time step. The electric field must be updated periodically if materials have temperature-dependent values of $\varepsilon_r$ or $\sigma$. Electrical field updates may consume considerable time, so it is essential to minimize operations in three-dimensional solutions with large meshes. Accordingly, the code implementing the method has been carefully analyzed to eliminate unnecessary or redundant operations. Several techniques have been implemented to reduce run time, such as variable time steps with automatic adjustment are used in the thermal solution. Further, whenever possible, the RF solution is scaled rather than recomputed. The program utilizes precomputed baseline RF solutions during pulsed RF simulations. In addition, element properties and coupling coefficients for the RF and thermal solutions are updated only for temperature-dependent materials.

4. Material Models and Temporal Variations

Electrosurgery simulations usually involve materials with significant variations of properties with temperature. Therefore, the system and method of the present disclosure, uses a flexible method of tabular functions to represent arbitrary temperature and time variations. A table is simply a text file where each line contains one value of an independent and dependent variable (e.g., temperature T and thermal conductivity k(T)).

Figure 4:
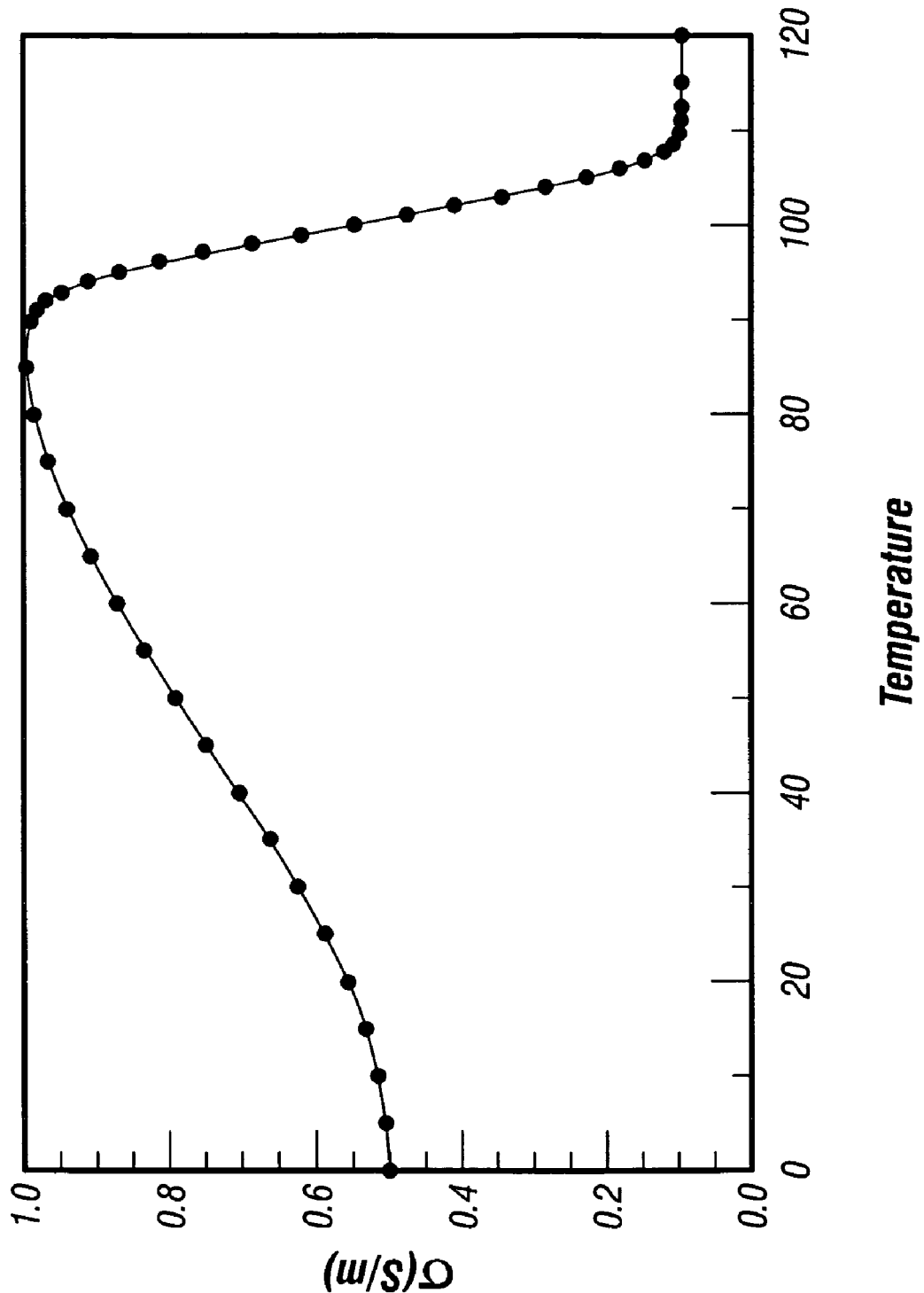
FIG. 4 is a graph defining a temperature-dependent electrical conductivity.

FIG. 4 shows a typical data set to represent a temperature-dependent electrical conductivity which is shown as a graph of electrical conductivity over temperature. Electrical conductivity of materials (e.g., tissue) varies with temperature, therefore the method and system according to the present disclosure account for these variations by updating RF field calculations.

The system and method incorporates a software unit to perform cubic spline or linear interpolations. The unit is designed so that tables appear as a continuous function to the calling program. The routines handle non-uniform intervals of the dependent variable. Flexibility is achieved through a free-form parser with automatic sorting and error checking. Tabular input has several advantages for the user, including data transparency, the option to maintain standard material libraries, efficient input of digitized or published data and easy electronic exchange of models.

Fixed values or tables may be applied to the following quantities in Equations 1 and 4: $\in_r$, $\sigma$, $C_P$, k and $W_b$. Physical quantities are assigned to materials. The program accepts up to 127 different material types. The elements of the mesh are divided into regions that represent physical objects like tissue types, dielectrics or electrodes. In turn, an element with a given region number is assigned an initial material and may be associated with different materials, depending on its thermal history. Flexible material assignment is the key to the implementation of phase changes. The properties of a region represented by a single table are non-linear but reversible. If the tissue cools, it returns to its original state.

The algorithm according to present disclosure represents permanent state changes by reassigning the material reference when the element reaches a setpoint temperature. The algorithm also maintains values of the Arrhenius damage integral that represent the extent of chemical changes. Damage integral values can also be used as setpoints. With the reassignment method, properties can be permanently changed, even if the element cools. For example, a particular element 14 is originally associated with a material with electrical conductivity that drops sharply at 100° C. At this temperature, the reference is shifted to a material with the properties of desiccated tissue. The conductivity will not rise even if the electrical power and temperature drops. All elements of a region have the same region number but may have different material associations. A region may have up to five alternate materials with ascending temperature or damage-integral setpoints.

5. Fixed-Current Operation and Temperature Control

As mentioned in Section 3, the RF solution yields the quasi-static potential at all points in solution volume for specified electrode potentials. In many applications, the equipment operates at fixed current or power rather than voltage. These global quantities are not natural boundary conditions of Equation 1, the method of the present disclosure uses an indirect approach. The current or power is calculated using the present voltages and material states. An adjustment factor to achieve the desired state is calculated and used to scale potential values.

The global power $P_0$ is calculated by taking a volume integral of time-averaged resistive power density ($\sigma EE^*/2$) over all material elements of the solution volume. In multi-electrode systems, the method assigns a general amplitude change to all electrodes. If P is the desired power level, then potential values are scaled by $\sqrt{P/P_0}$. The calculation of current from an electrode requires a surface integral of current density over the fixed-potential region. Initially, the method gathers a list of facets of fixed-potential region elements that are common to conductive/dielectric elements. The program determines the current passing through each facet using a 4×4 normal coordinate integral of normal electric field, and sums the real and displacement currents to find the amplitude $I_0$. If I is the desired current amplitude, potential values at all nodes are scaled by $I/I_0$.

The tabular functions described in Section 4 are also employed in the method of the present disclosure to represent arbitrary temporal variations such as a time-dependent thermal source $q_m$ or boundary temperature. The program also stores several generalized functions that are used for feedback control. In this case, the method uses a region-averaged temperature as the independent variable and use the tabular function output as a multiplying factor for probe voltages. The method generates a programmed voltage to maintain average temperature in a region near 60.0° C. The control function capability makes the method of the present disclosure a useful tool to test the dynamics and stability of control loops in electrosurgery equipment.

6. Sequence Control

Because of wide variety of operating modes encountered in electrosurgery and RF ablation procedures, the system and method of the present disclosure include a versatile control capability based on a custom interpreter language. The program makes decisions and change operating modes depending on the temperature history of the medium. The organization of the control script follows the logic of an actual treatment. Initially there are given conditions that are not controlled by the operator: the geometry of the patient and probe and the intrinsic properties of materials (including temperature dependencies). During the procedure, the operator modifies applied voltages and the pulse sequence in response to changes of electrical and thermal properties. Accordingly, the control script contains one SETUP section for the definition of general control parameters and material properties. This section is followed by an unlimited set of STATE sections. Each STATE section represents a particular activity that the operator may choose, such as, for example, "apply 2000 mA current until the probe impedance rises 10% from its initial value," or "lower the voltage to half its present value until the maximum temperature of the region drops to less than 60° C."

STATE commands perform the following exemplary types of activities: 1) setting STATE properties such as the maximum duration and frequency of command updates; 2) setting parameters of the RF solution such as voltage amplitude and phase, frequency or global power; 3) returning values of state variables such as average temperature in a region, elapsed time in a STATE, and electrode current; 4) storing numbers in program variables with the operation to perform a broad range of mathematical operations; 6) testing conditions to exit a STATE; and 7) implement control loops to repeat a group of STATES.

Table 2 below shows an example of the control language.

TABLE 2

```
X(4) = 28.0
Relax
X(10) = Impedance(3)
X(2) = X(10) 1.15 *
ENDSTATE
#STARTLOOP
   STATE 200.0 2.5
      Voltage(3) = X(4)
      Relax
      Show Impedance(3)
      Show MaxTemp
      X(3) = StateTime
      X(1) = Impedance(3)
      Test X(1) > X(2)
   ENDSTATE
   STATE 0.0 0.0
      Test X(3) > 10.0
      X(5) = X(4) 1.0 -
      X(4) = X(5)
   ENDSTATE
   STATE 15.0 15.0
      Voltage(3) = 2.0
      Relax
   ENDSTATE
#GOTO STARTLOOP 402.0
```

The algorithm according to the present disclosure records a variety of diagnostic data during the thermal solution. The program creates data files (snapshots of the RF or thermal solutions) at up to 500 specified times. The program also allows the user to place up to 20 diagnostic probes at different positions in the solution volume. The probes generate output files containing complete records of temporal variations of electric and thermal quantities.

7. Analysis Tools

The method of the present disclosure includes dedicated post-processors to generate plots and to analyze RF and thermal solutions. The method features interactive graphical capabilities that allow the user to move easily through the solution volume. Two dimensional plots show quantities in a plane normal to the x, y or z axes. There are two styles. First, is a plane plot which is a projection of field quantities to a rectangular grid. The simple grid makes it possible to construct advanced displays such as 2D and 3D filled-contour plots. Second, is a slice plot which is a projection that preserves the structure of the conformal mesh. This mode accurately shows regions boundaries and allows point-and-click display of point or scan quantities in a particular plane of the medium 8.

Figure 5:
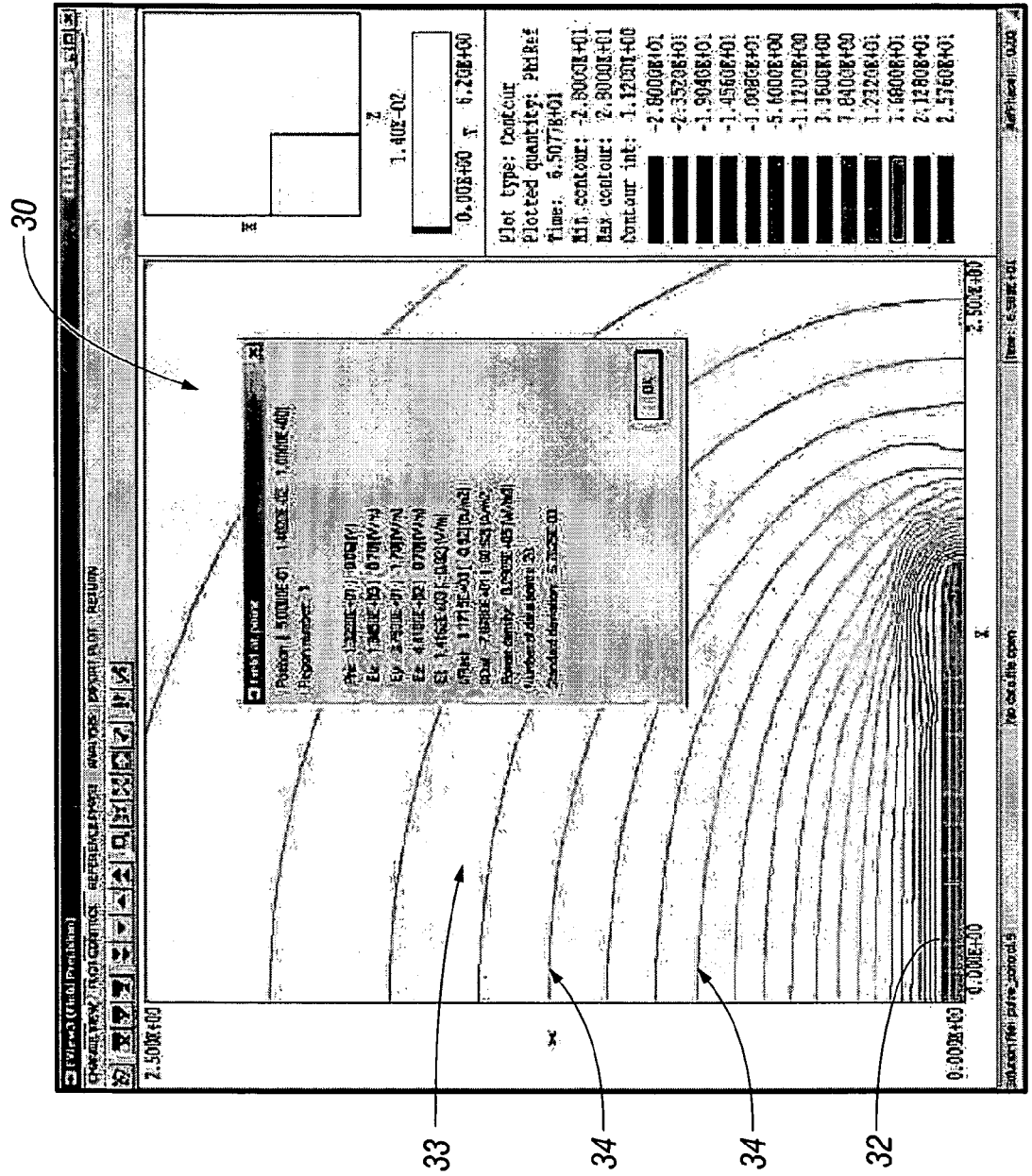
FIG. 5 is a screen shot of the software of the present disclosure for radio frequency electric fields illustrating analysis capabilities in a two-dimensional slice plot mode.

An exemplary slice plot 30 of the medium 8 is shown FIG. 5. The slice plot 30 displays an electrosurgical probe 32 generating an electric field 33 represented by contour lines 34. RF solution quantities that are displayed include the quasi-static potential, electric field components, real and displacement currents and power density. The program shows either the amplitude of field quantities or a snapshot of the field at a given reference phase.

The method according to the present disclosure also plots spatial variations of $\in_r(T)$ and $\sigma(T)$ for solutions with temperature-dependent materials. Thermal quantities plotted include the temperature and thermal flux. Spatial variations in $k(T)$, $C_P(T)$, and $W_b(T)$ are displayed for solutions with temperature-dependent materials.

Figure 6A:
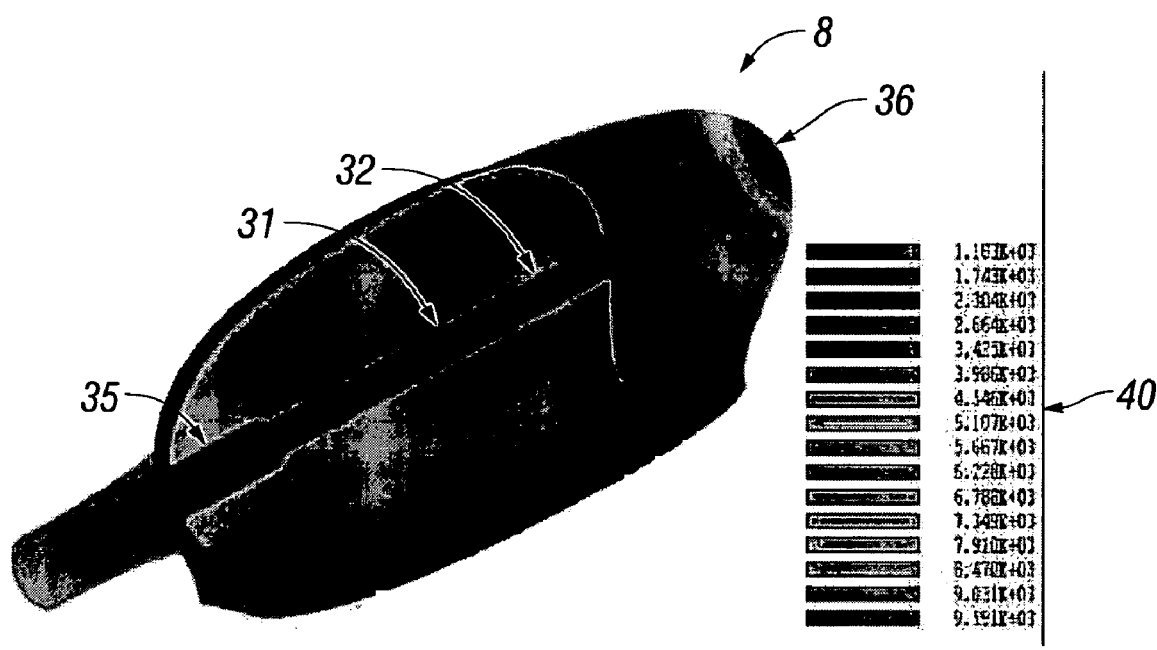
FIG. 6A illustrates an isothermal surface with gray scale coding determined by the magnitude of thermal flux.
Figure 6B:
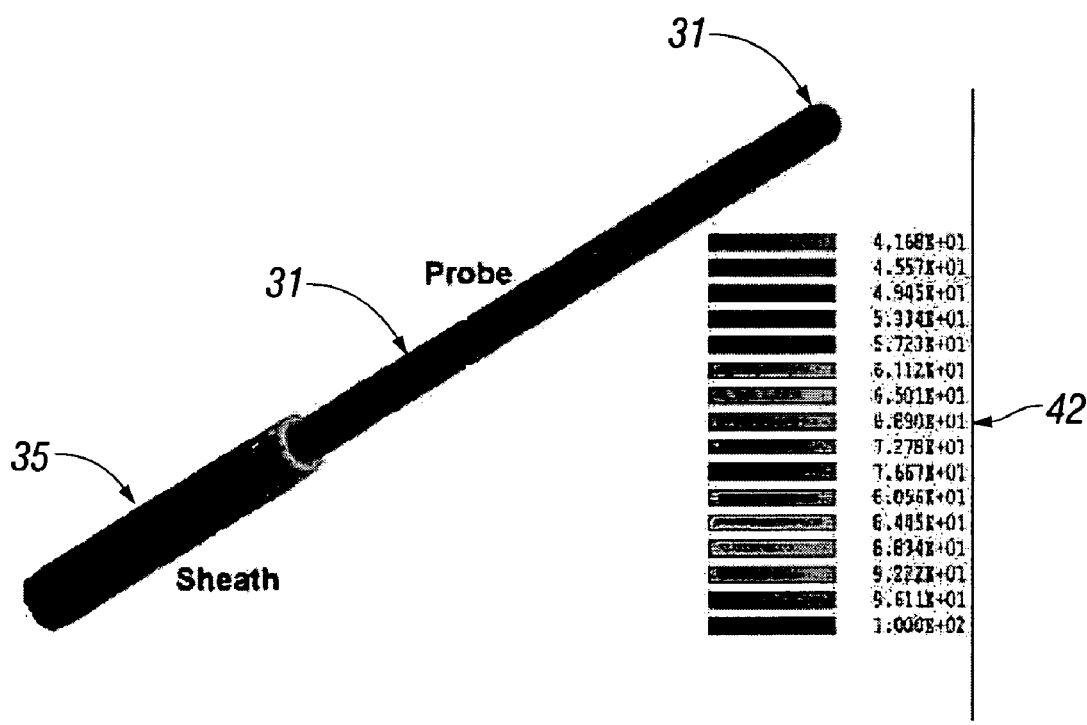
FIG. 6B is a representation of region boundaries of the probe and sheath gray scale coded by temperature.

Solutions are also represented using advanced 3D plots with surfaces constructed directly from the conformal mesh. FIGS. 6A-B show two examples. FIG. 6A shows an isothermal surface with identifying regions thermal flux of the medium 8. In particular, FIG. 6A shows the probe 32 having an exposed electrically conductive shaft 31 and an insulated sheath 35 within a tissue 36. It is envisioned that color coding (shown in gray scale) may be used to illustrate gradual shifting of the thermal solution. On the right side of the plot, a gray scale coded index 40 is shown. It is envisioned that the index 40 may also be color-coded to better represent the gradations in thermal flux of the plot. This type of plot is useful for displaying the shape of the treatment volume.

FIG. 6B shows boundary facets on selected regions. FIG. 6B also shows the probe 32 having with the shaft 31 and the sheath 35. This plot type is useful to display surface temperatures on electrodes and organs. By splitting objects into two or more regions, it is possible to display temperature variations on arbitrary three-dimensional surfaces. On the right side of the plot, a gray scale coded index 42 is shown. It is envisioned that the index 42 may also be color-coded to better represent the gradations in temperature of the plot.

Both post-processors have extensive capabilities for quantitative analysis. These include point calculations and line scans using a second-order, least-squares-fit procedure. Information is displayed within the program or is ported to an analysis history file in text format. Line scans generate screen plots with digital oscilloscope features. Complex or repetitive operations are controlled by scripts. The program performs automatic volume integrals over regions of the solution space. Calculated quantities include RF field energy, total resistive power dissipation, and average temperature. Surface integrals employ the same routines for current calculations. Output quantities include net current or thermal flux. The post-processors include the option to create matrix files where electrical or thermal quantities are projected from the conformal mesh to regular box mesh.

8. Application Examples

This section reviews two examples that illustrate some of the features of the system and method of the present disclosure. The first example addresses solution accuracy, operation at constant current and the ability to handle temperature-dependent materials. The simple test geometry consists of concentric cooled spherical electrodes of radii $r_i=1.0$ cm and $r_o=5.0$ cm separated by a uniform medium with $\in_r=1.0$. The electrical conductivity is defined by a table with values that start at $\sigma=1.0$ S/m at T=0.0° C. and drop smoothly to 0.2 S/m in the range T=20.0° C. to T=120.0° C. Both electrodes are maintained at a reference temperature of 0.0° C. The outer electrode is grounded and the inner electrode has a time-dependent voltage to maintain constant current. The medium has the thermal properties k=100.0 W/m-° C., $C_p$=4800.0 J/kg-° C. and $\rho$=1000.0 kg/m³. The approximate side length of the elements near the inner sphere is 0.1 cm.

The total current flowing through the medium is determined by a surface integral of normal electric field over the inner sphere. Initially all elements are near 0.0° C. and the conductivity is $\sigma \approx 1.0$ S/m. This allows for comparison of the impedance calculated by the algorithm to the analytic formula:

$$R = \frac{\left(\frac{1}{r_i} - \frac{1}{r_0}\right)}{4\pi\sigma} \quad (5)$$

Inserting values in Equation 5 gives 6.366 Ω, while the calculation using the method according to the present disclosure yields 6.371 Ω. The small difference results from the fact that the shape used by the method of the present disclosure is a multi-faceted polyhedron rather than a sphere, therefore it is a close approximation of the actual shape of the medium 8.

The thermal solution advances for 50 seconds with a variable time step. The control script contains three STATES. The first sets up a baseline RF solution at f=60.0 Hz with 250 V applied to inner sphere. The second STATE advances the thermal solution for 10 seconds and updates commands at 1 second intervals to include effects of changing electrical conductivity. The STATE includes the command Current(3)=5.7.

The command maintains approximately constant current from the inner sphere by correcting the voltage. In response to the command, the algorithm recalculates the field every 1.0 second, takes the surface integral to determine the current, and scales potential values in the solution space to bring the current to 5.7 Amps. Additional commands instruct the program to record values of voltage and maximum temperature in the solution volume at each update. The third state (which runs from 10 to 50 seconds) has the same commands with an update interval of 2.5 seconds.

Figure 7:
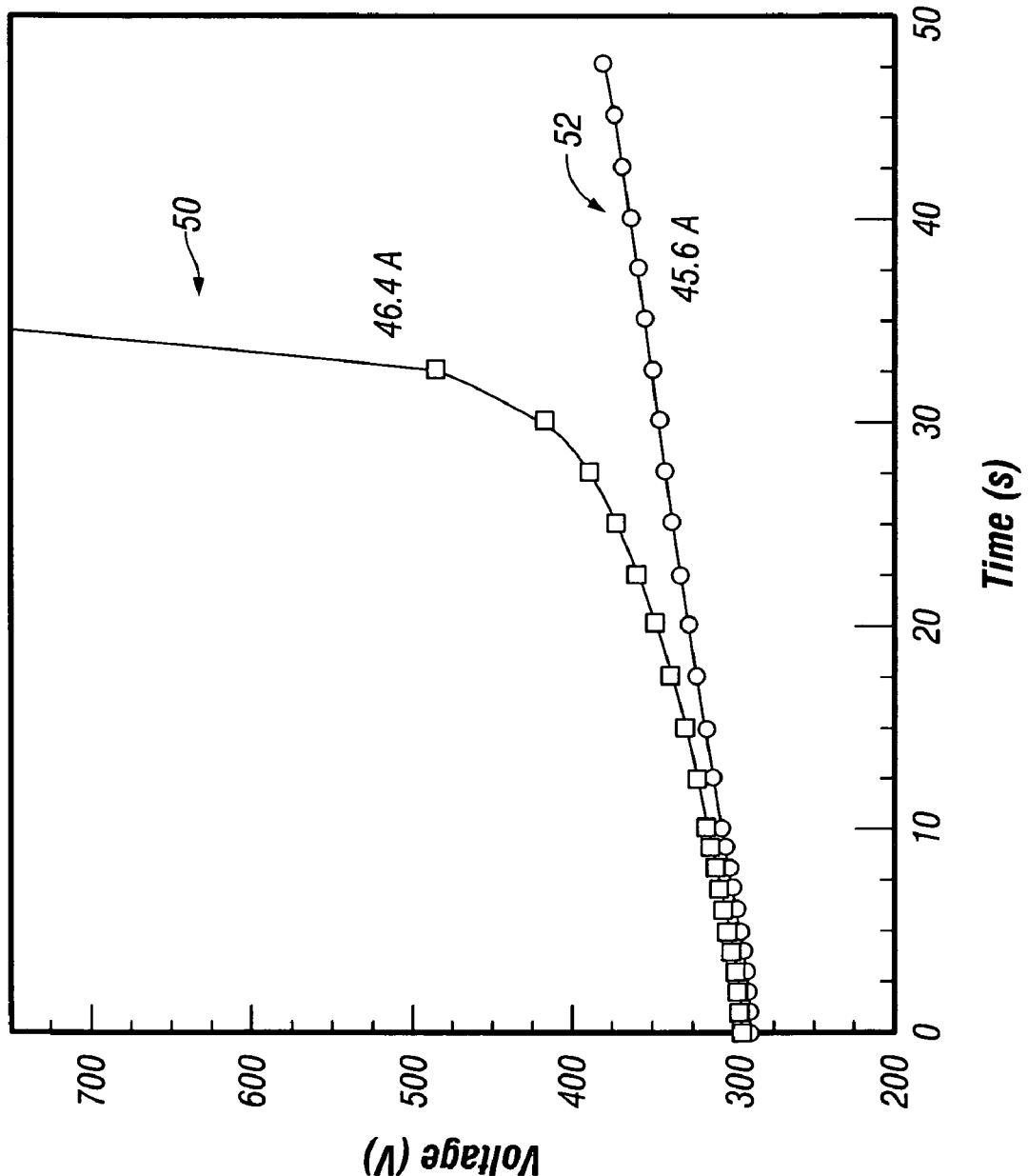
FIG. 7 shows voltage variation required to maintain constant current with decreasing conductivity for two values of a drive current.

FIG. 7 shows the voltage variation required to maintain constant current with decreasing conductivity for two values of the drive current. The 5.8 Amp curve 50 exhibits thermal run-away, while a curve 52 does not have a similar defect. A constant-current solution may become unstable when the electrical conductivity drops with increasing temperature. Thermal run-away is a real effect rather than a numerical artifact; similar phenomena are observed in experiments with electrosurgery equipment. FIG. 7 demonstrates that non-linear solutions must be approached with caution—a small change in input may make a dramatic difference in output.

Figure 8:
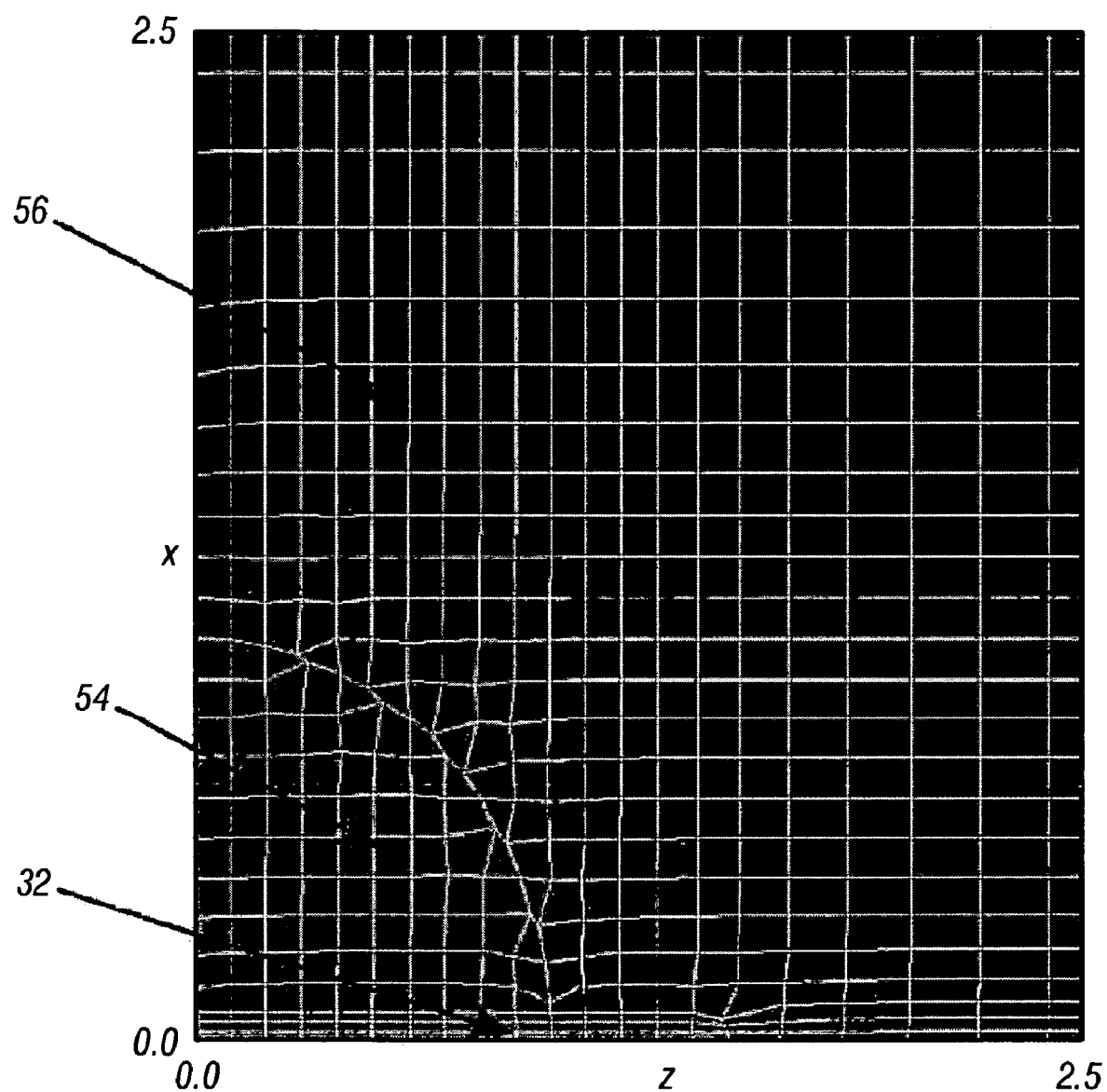
FIG. 8 shows a two-dimensional slice plot of the electrical solution.

FIG. 8 shows a two dimensional slice plot of the electrical solution. Here, the probe 32 with length 3.0 cm is inserted in a 2.0 cm diameter tumor 54 within a liver 56. The calculation was performed in single octant with symmetry boundaries at x=0.0, y=0.0 and z=0.0 using a mesh of 74,000 elements. In the calculation, both the liver 56 and tumor 54 have the conductivity variation shown in FIG. 4. Electrical conductivity rises 2% per degree up to around 100° C. where a sharp drop represents tissue vaporization.

Table 2 above shows the main portions of the STATE sections of the control script. The included commands from the initial STATE store a value of applied voltage in program variable X(4) as a parameter, calculate a baseline normalized solution to determine the zero-temperature impedance and set a trigger level 15% higher. The next three STATES are contained in a loop that runs for a maximum time of 402 seconds. The commands of the first STATE sets the voltage to X(4) and advance the thermal solution until either: 1) the state time reaches 200 seconds or 2) the impedance exceeds the trigger level. The RF solution is updated and checks are performed at 2.5 second intervals.

The second STATE has zero duration so the commands are executed only once per loop cycle. No action is taken if the duration of the previous state exceeds 10 seconds. Otherwise, the baseline voltage is reduced by 1.0 V. The commands of the third STATE reduce the voltage to 2.0 V and advance the thermal solution for 15 seconds to allow cooling of the region near the probe.

Figure 9A:
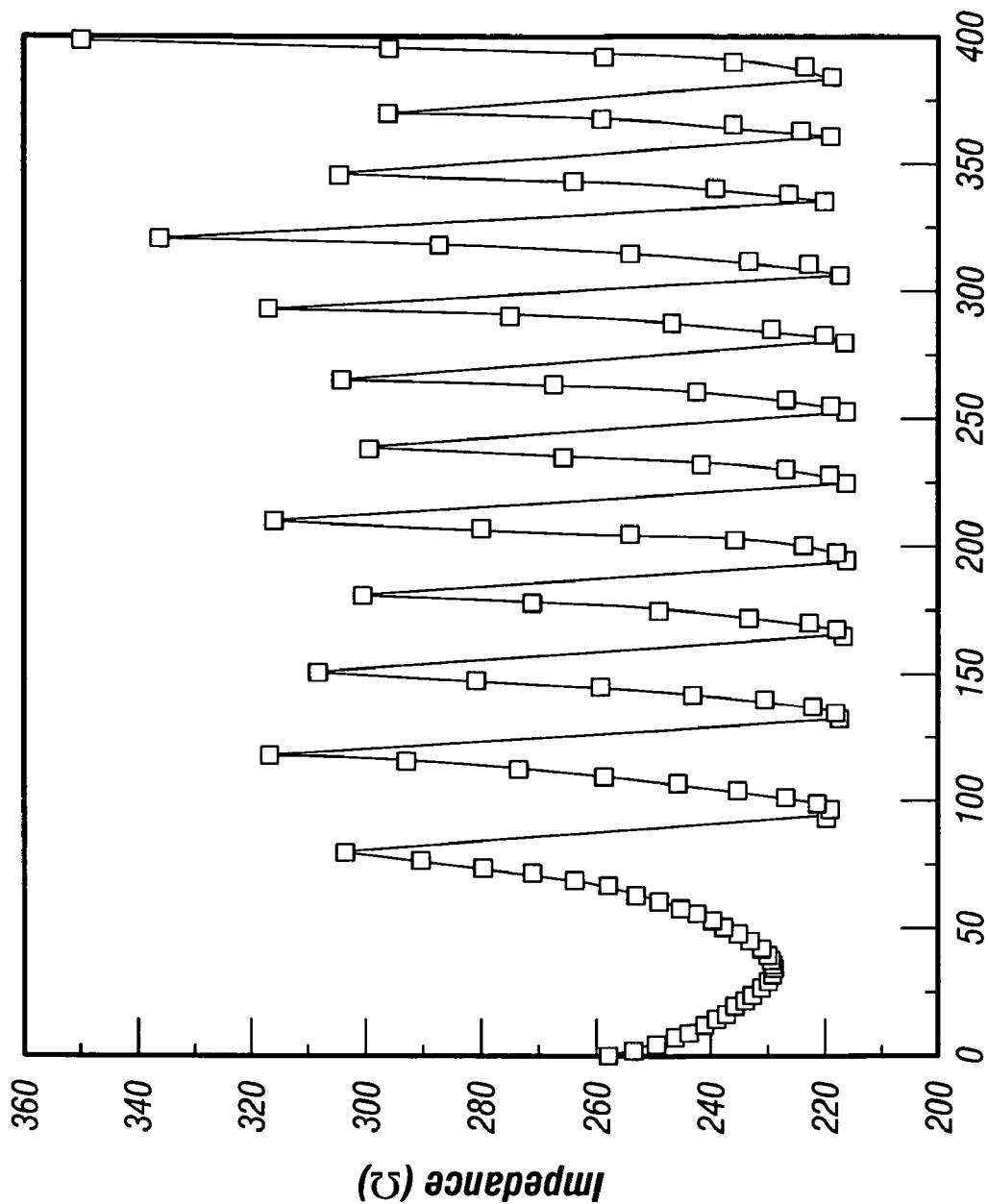
FIG. 9A is a plot of probe impedance over time in a solution volume.
Figure 9B:
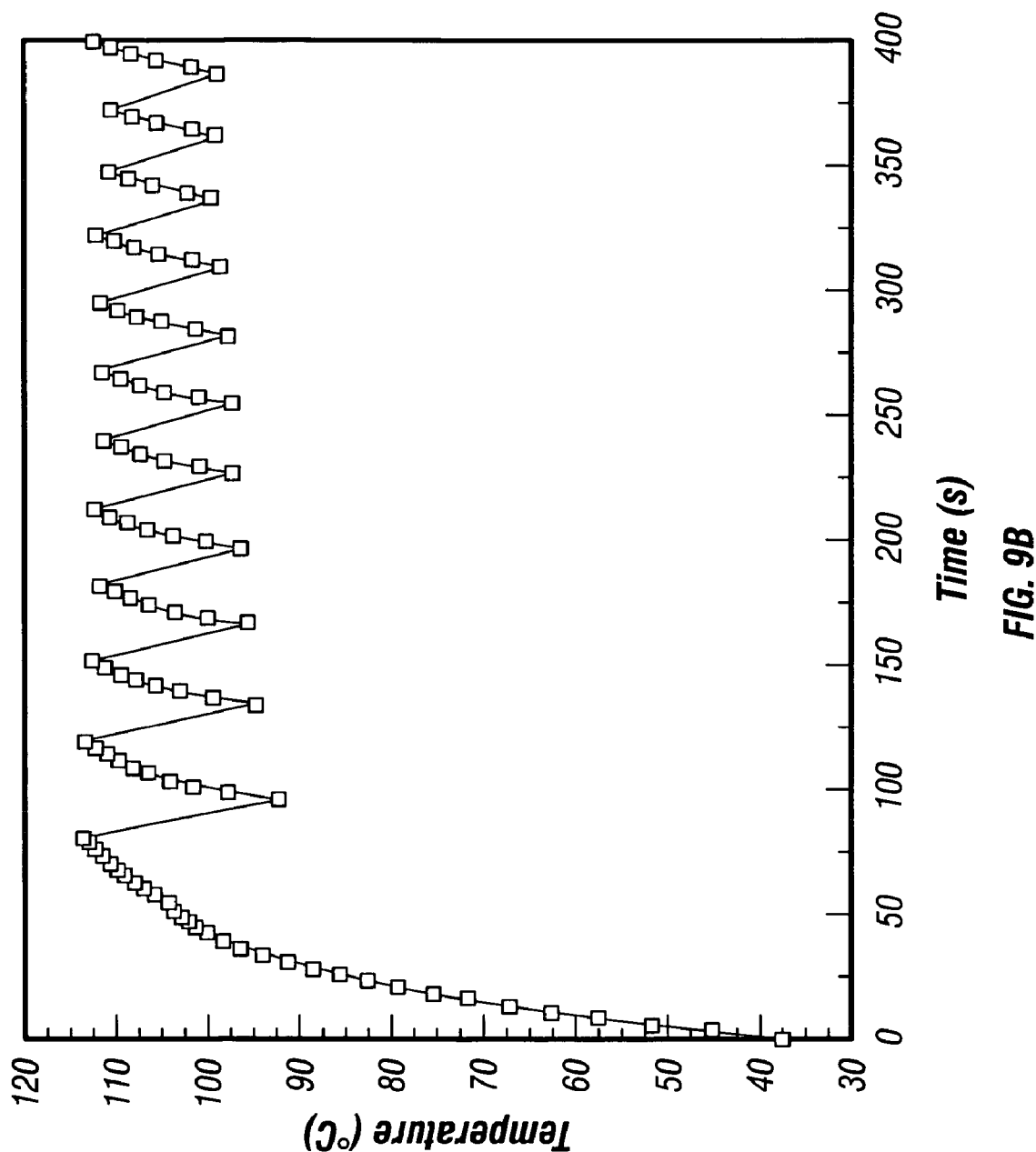
FIG. 9B is a plot of maximum temperature over time in the solution volume.

The algorithm according to the present disclosure also outputs data in a variety of graph, such as impedance over time and temperature over time plots shown in FIGS. 9A and 9B respectively. In the first pulse cycle, the impedance initially drops as the medium heats and then follows a rapid rise as the medium around the probe tip approaches 100° C. In the impedance plot, triggering does not occur exactly at the setpoint level of 300 Ω because checks are performed only at 2.5 second intervals. The temperature plot of FIG. 9B shows the maximum temperature recorded in the solution space at a point near the tip of the probe 32 in the region of enhanced electric field. Records of temperature at other positions confirm that the pulse cycle restricts temperature in the bulk of medium surrounding the probe to values less than 100° C.

Figure 10:
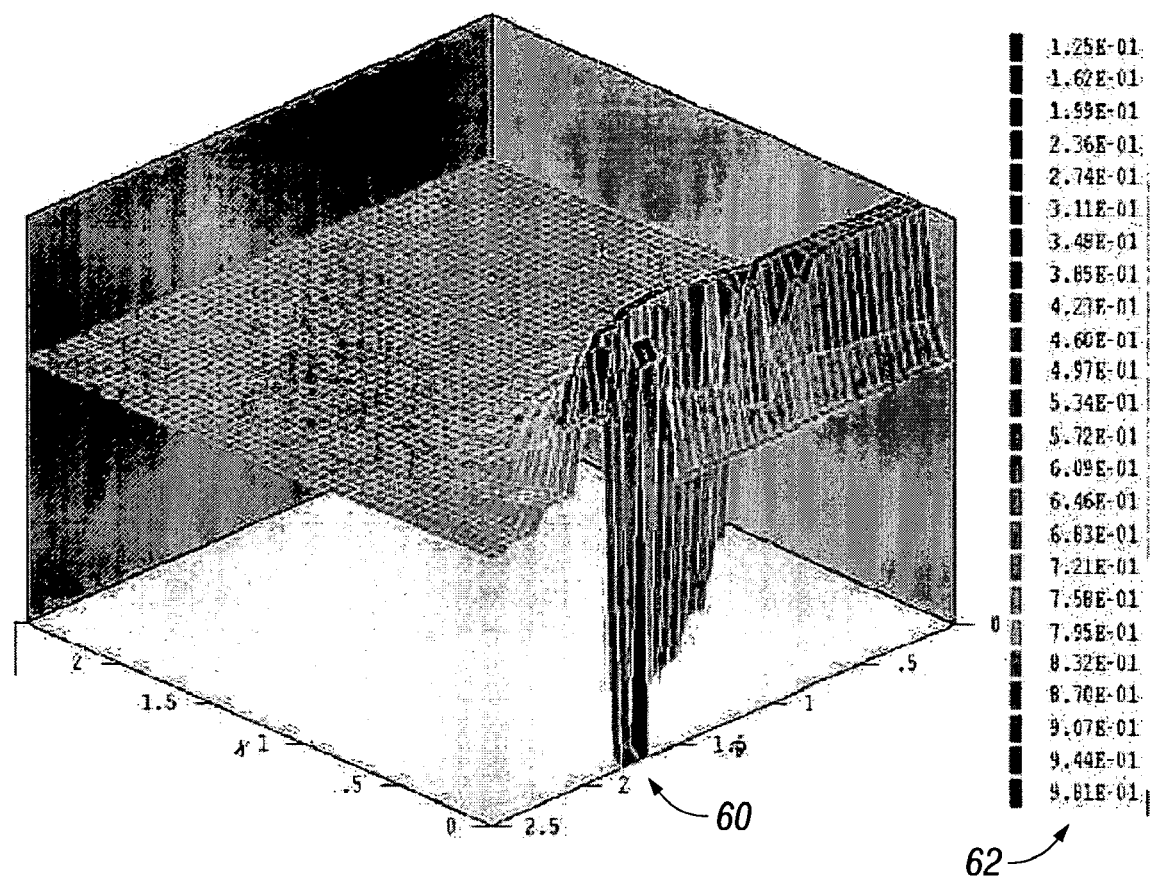
FIG. 10 shows spatial variation of electrical conductivity in a particular plane.

In addition, the algorithm also displays electrical conductivity plots. FIG. 10 shows the spatial distribution of electrical conductivity in the plane y=0.0 late in the pulse (t=65.1 seconds). Although some areas have enhanced conductivity, σ is sharply reduced near a region 60 representing the tip of the probe 32. On the right side of the plot, a gray scale coded index 62 is shown. It is envisioned that the index 62 may also be color-coded to better represent the gradations in electrical conductivity of the plot.

The simulation involves 120 recalculations of the electrical field with a total run time of 22 minutes on a 3 GHz computer. The example illustrates that complex three-dimensional simulations are feasible on standard personal computers with careful pre-analysis to eliminate unnecessary details.

Figure 11:
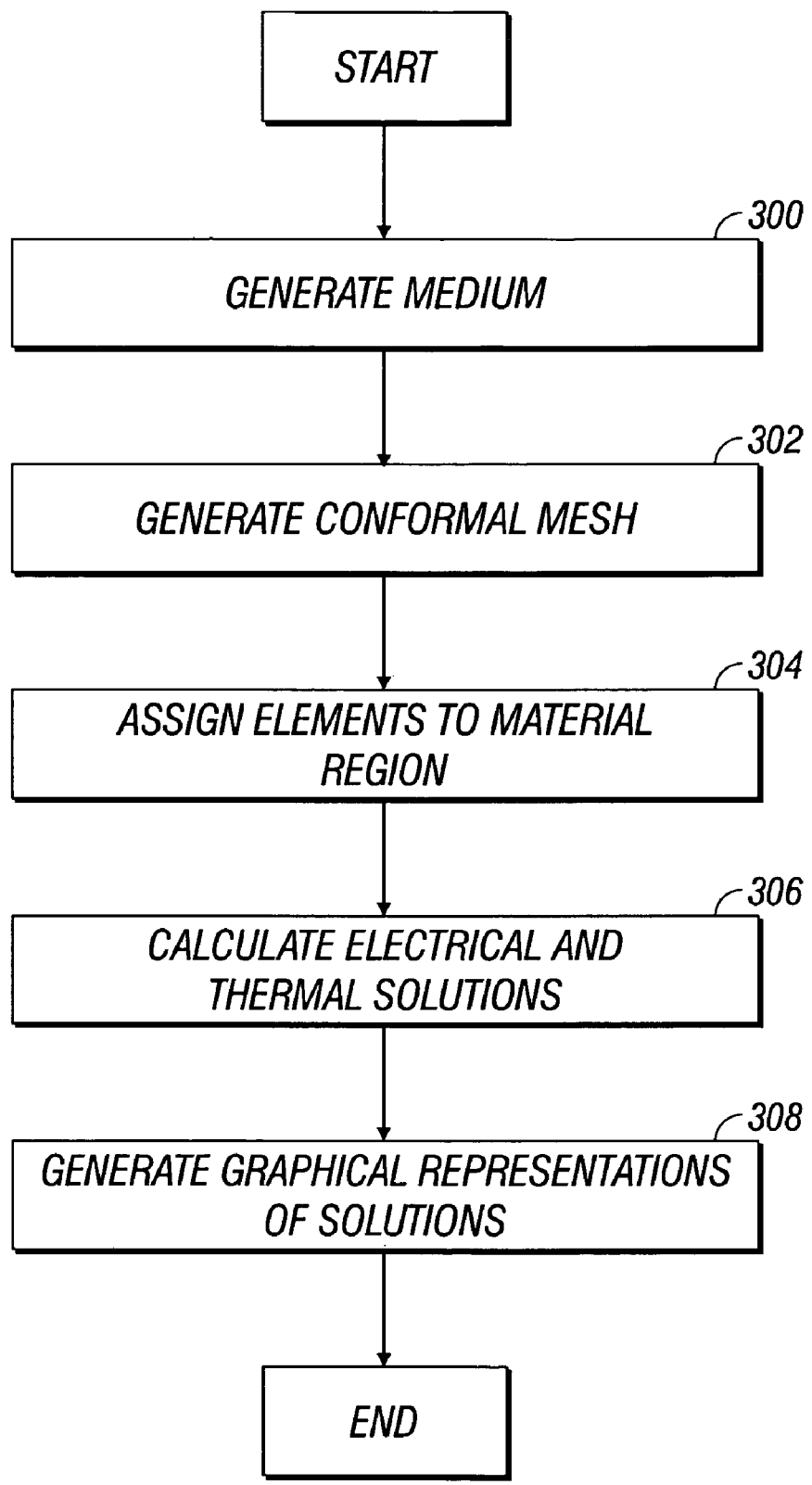
FIG. 11 shows a flow chart illustrating a method according to the present disclosure.

FIG. 11 shows a flow chart illustrating the method according to the present disclosure. In step 300, the processor 102 generates the medium 8. The medium 8 may include the tissue 20 with the probe 32 therein as shown in FIG. 3. In step 302, the processor 102 divides the medium into hexahedron elements 14 to generate the three-dimensional conformal mesh 12 as shown in FIG. 2C. In step 304, the processor 102 assigns each element 14 to a specific material region. For example, elements 14 within the protrusion of the probe 32 as shown in FIG. 3 are assigned to a material region of the probe, while elements 14 within the tissue 20 are assigned into the corresponding material region. In step 306, the processor 102 calculates the electrical energy solution and the thermal transport solution. In step 308, the display device 112 outputs graphical representations of the solutions, such as various plots illustrated in FIGS. 5-10.

While the disclosure has been shown and described with reference to certain preferred embodiments thereof, it will be understood by those skilled in the art that various changes in form and detail may be made therein without departing from the spirit and scope of the disclosure.

What is claimed is:

1. A computer implemented method for performing a simulation of an electrosurgical procedure on tissue, the method comprising the steps of:

generating a three-dimensional model of a medium comprising at least one material region representing a physical object or a region of the tissue;

dividing the model of the medium into a plurality of hexahedron elements to generate a three-dimensional conformal mesh;

assigning each element to a corresponding at least one material region;

calculating at least one of an electrical energy solution and a thermal transport solution based on at least one mathematical model, the plurality of hexahedron elements and finite element method;

updating at least one property value of the at least one material region at least once in response to temperature changes based on an empirically derived value;

updating at least one of the electrical energy solution and the thermal transport solution as a function of the at least one property value; and generating and displaying at least one graphical representation representing at least one form of the electrical energy solution and one form of the thermal transport solution on an output device.

2. The method as in claim 1, wherein the step of calculating the electrical energy solution further comprises a step of solving equations 1 and 2

$$\nabla \cdot \left[ \left( \varepsilon_r - \frac{j\sigma}{\varepsilon_0 \omega} \right) \nabla \phi \right] = 0 \quad (1)$$

$$E = -\nabla \phi \quad (2)$$

wherein $\varepsilon_r$ is a relative dielectric constant, and σ is electrical conductivity of each of the elements, j is an imaginary number, $\varepsilon_0$ is vacuum permittivity, ω is angular frequency, φ is a quasi-static potential, which is a complex number, and E is amplitude and phase of electric field.

3. The method as in claim 2, wherein the step of calculating the thermal transport solution further comprising a step of solving equations 3 and 4:

$$q_e = \sigma E \cdot E* / 2 \quad (3)$$

$$\rho C_p \frac{\partial T}{\partial t} = \nabla \cdot (k \nabla T) + q_e + q_m + W_b (T_b - T) \quad (4)$$

wherein ρ is density of the medium, $C_{92}$ is specific heat, k is thermal conductivity, $q_m$ is heat generated by metabolism, $q_e$ is resistive source, and $W_b(T_b-T)$ represents thermal variations caused by blood flow.

4. The method as in claim 1, wherein the material region includes a material state, the material state comprising at least one physical property.

5. The method as in claim 4, wherein the at least one physical property is selected from the group consisting of relative dielectric constant, electrical conductivity, specific heat, thermal conductivity, and blood flow.

6. The method as in claim 5, wherein the at least one physical property is temperature-dependent.

7. The method as in claim 6, wherein a tabular function stores a plurality of temperature-dependent values for the at least one physical property.

8. The method as in claim 1, wherein the plurality of elements are ordered in the three-dimensional mesh according to cubic logic.

9. The method as in claim 1, wherein the graphical representation is a three-dimensional plot and the at least one form of the thermal solution is an isothermal surface of the medium.

10. The method as in claim 1, wherein the graphical representation is a two dimensional slice plot and the at least one form of the electrical solution is electrical conductivity of the medium.

11. A computing system for performing a simulation of an electrosurgical procedure on tissue, the system comprising:
at least one processor coupled to a memory storing a program of instructions, wherein when the program is executed on the at least one processor, the at least one processor performs the instructions of:
generating a three-dimensional model of a medium comprising at least one material region representing a physical object or a region of the tissue;
dividing the model of the medium into a plurality of hexahedron elements to generate a three-dimensional conformal mesh;
assigning each element to a corresponding at least one material region;
calculating at least one of an electrical energy solution and a thermal transport solution based on at least one mathematical model, the plurality of hexahedron elements and finite element method;
updating at least one property value of the at least one material region at least once in response to temperature changes based on an empirically derived value; wherein at least one of the electrical energy solution and the thermal transport solution is updated as a function of the at least one property value; and
an output device which outputs at least one of a graphical representation representing at least one form of the electrical energy solution and one form of the thermal transport solution.

12. The system as in claim 11, wherein the material region includes a material state, the material state comprising at least one physical property.

13. The system as in claim 12, wherein the at least one physical property is selected from the group consisting of relative dielectric constant, electrical conductivity, specific heat, thermal conductivity, and blood flow.

14. The system as in claim 13, wherein the at least one physical property is temperature-dependent.

15. The system as in claim 14 wherein a tabular function stores a plurality of temperature-dependent values for the at least one physical property.

16. The system as in claim 11, wherein the plurality of elements are ordered in the three-dimensional mesh according to cubic logic.

17. The system as in claim 11, wherein the graphical representation is a three-dimensional plot and the at least one form of the thermal solution is an isothermal surface of the medium.

18. The system as in claim 11, wherein the graphical representation is a two dimensional slice plot and the at least one form of the electrical solution is electrical conductivity of the medium.

19. A computer-readable storage medium storing a set of computer-executable instructions for performing a simulation of an electrosurgical procedure on tissue, the computer-executable instructions comprising the steps of:
generating a three-dimensional model of a medium comprising at least one material region representing a physical object or a region of the tissue;
dividing the model of the medium into a plurality of hexahedron elements to generate a three-dimensional conformal mesh;
assigning each element to a corresponding at least one material region;
calculating at least one of an electrical energy solution and a thermal transport solution based on at least one mathematical model, the plurality of hexahedron elements and finite element method;
updating at least one property value of the at least one material region at least once in response to temperature changes based on an empirically derived value;
updating at least one of the electrical energy solution and the thermal transport solution as a function of the at least one property value; and
generating and displaying at least one graphical representation representing at least one form of the electrical energy solution and one form of the thermal transport solution on an output device.

* * * * *